United States Patent [19]

Miller

[11] 4,028,797

[45] June 14, 1977

[54] METHOD FOR ASSEMBLING RESILIENT BUSHINGS

[75] Inventor: Harvey E. Miller, Logansport, Ind.

[73] Assignee: The General Tire & Rubber Company, Akron, Ohio

[22] Filed: Oct. 17, 1975

[21] Appl. No.: 623,515

Related U.S. Application Data

[63] Continuation of Ser. No. 248,097, April 27, 1972, abandoned.

[52] U.S. Cl. .................................... 29/451; 29/235

[51] Int. Cl.² .......................................... B23P 11/02

[58] Field of Search ...................... 29/450, 451, 235

[56] References Cited

UNITED STATES PATENTS

| | | | |
|---|---|---|---|
| 1,961,536 | 6/1934 | Thiry | 29/450 UX |
| 2,550,564 | 4/1951 | Hutton | 29/450 UX |
| 2,572,215 | 10/1951 | Swart | 29/235 X |
| 2,632,236 | 3/1953 | Dodge | 29/235 X |
| 2,660,780 | 12/1953 | Beck | 29/235 |
| 2,895,215 | 7/1959 | Neher | 29/235 |
| 2,930,640 | 3/1960 | Davis et al. | 29/450 X |

*Primary Examiner*—Charlie T. Moon

[57] ABSTRACT

An *n*th derivative mandrel for use in assembling bushings having an annular elastomeric insert radially compressed between a pair of concentric sleeves. The mandrel profile is the *n*th time derivative of velocity and, preferably, either constant velocity, $n = 1$, or constant acceleration, $n = 2$. The mandrel profile may also be a composite of two or more time derivatives along its length.

2 Claims, 5 Drawing Figures

METHOD FOR ASSEMBLING RESILIENT BUSHINGS

This is a continuation, of application Ser. No. 248,097 filed Apr. 27, 1972, now abandoned.

THE INVENTION

The present invention relates to an improved apparatus for the assembly of bushings, and in particular, to an improved mandrel for use in assembling bushings having an annular elastomeric insert between a pair of concentric sleeves.

BACKGROUND OF THE INVENTION

Bushings having an annular rubber or elastomeric insert between a pair of concentric sleeves have been known and used for many years. Generally, the bushing is used for mounting a second member, e.g. a motor, to a first member, e.g. an automobile frame, where the members must move relative to each other. The inner sleeve is secured, for example by a pin or bolt, to the first member, and the outer sleeve is secured to the second member. The relative axial, lateral, and rotational movement between the two members is accomodated by the elastomeric or rubber annular insert.

By radially compressing the rubber insert between the inner and outer sleeves, increased load bearing and lifetime can be achieved. In such a bushing the molded rubber insert is cured prior to assembly and held in place under radial compression; the restorative tendencies of the rubber aid in preventing relative motion between the insert and the sleeves A number of methods and apparatus have been used for assembling the elastomeric insert for radial compression between the inner and outer sleeve members. See, for example, U.S. Pat. Nos. 2,690,001 and 2,660,780. Generally, apparatus for assembling rubber-metal bushings includes a support member upon which is mounted an open ended guide funnel. A clamping mechanism is located at the small end of the funnel and in axial alignment therewith, for positioning the outer sleeve. A plunger is provided in axial alignment with and advanceable axially into the large end of the funnel face. A mandrel is located at the opposite end of the support and in an axially aligned position with the funnel member. The mandrel is usually of a tapered or frusto conical profile with its smallest diameter approximately equal to or smaller than the annular opening in the rubber insert and its larger diameter substantially equal to the outside diameter of the inner sleeve. The inner sleeve member is positioned behind the larger diameter of the mandrel for insertion into the insert.

To assemble the bushing, the annular elastomeric insert is positioned between the plunger and large end of the funnel, and is inserted into the outer sleeve by means of the plunger forcing the insert through the large end of the funnel for compression into the outer sleeve positioned at the opposite end of the funnel. The mandrel, with the inner sleeve positioned behind it, is then forced through the annular opening in the insert to position the inner sleeve member therein. The plunger and mandrel are retracted to expose the completed assembly.

Improved apparatus has been proposed for the construction and assembly of rubber-metal bushings. See, for example, U.S. Pat. No. 3,555,655. In this improved apparatus, a mandrel assembly and a nesting assembly are axially aligned and spaced apart from one another. The mandrel assembly comprises an elongated enclosed mandrel cylinder and a piston therein. A first abutment surface is provided to contact one end of the elastomeric insert. Through the abutment surface extends an elongated rod, one end of which is joined to the piston an the other end of which forms a head including a tapered tip and a frusto conical portion, the diameter of which decreases toward the aperture through which it extends. The junction between the tip and frusto conical portion forms a shoulder for engagement with one end of the inner sleeve. The first abutment surface and the mandrel are both capable of independently moving to and from a nesting assembly. The nesting assembly includes an annular stationary holder for the outer sleeve of the bushing. A plunger is provided which is movable through the holder in a direction to and from the mandrel, and includes an insert abutment shoulder and a positioning pin for the inner sleeve. In operation, the mandrel including the tip and conical portion first passes through the free or unconstricted inner annular opening of the elastomeric insert, after which the abutment surface of the mandrel engages the insert and forces it into the outer sleeve which is positioned in the nesting assembly. As the first abutment surface of the mandrel engages and forces the annular insert into the outer sleeve, the tapered tip and shoulder of the frusto conical portion engages the inner sleeve member positioned on the plunger of the nesting assembly. The plunger and mandrel are then forced back through the annular opening in the insert to position the inner sleeve therein.

Both types of devices require a mandrel for radially enlarging the opening in the compressed elastomeric insert for the insertion of the inner sleeve member. Both means of assembling the inner sleeve require a large axial force not only because of the high radial forces of the compressed insert, but also because of the inherently high axial frictional forces of the elastomeric or rubber insert. In addition to the high axial forces required, the operation of assembling the bushing, particularly the inner sleeves, produces high noise levels which are not satisfactory.

SUMMARY OF THE INVENTION

The present invention overcomes the disadvantages associated with the prior art apparatus by providing a novel mandrel for use in such apparatus which improves flow control or the flow rate of the elastomeric insert during assembly. The mandrel of the present invention provides a more uniform contacting of the elastomeric insert and inner sleeve to render the stress and strain throughout the assembly more uniform. Further, a reduction in power as well as noise during assembly is achieved by the present invention.

The present invention provides an improved mandrel which is adaptable for use in both new and existing apparatus for the assembly of bushings. In accordance with the present invention, the tapered or frusto conical portion of the mandrel, or segments thereof conforms to an nth time derivative of velocity profile and, preferably, to either a constant acceleration or constant velocity profile.

Generally, the smallest diameter of the mandrel is located at the end or tip adapted for initially entering into the radially compressed insert. The diameter increases along its length to the back portion which is used as a shoulder upon which the leading peripheral edge of the inner sleeve abuts. Preferably, the tip has a diameter less than that of the insert opening when radially compressed by the outer sleeve. The diameter of the shoulder is preferably slightly larger than the outer diameter of the inner sleeve. The tip may be either elongated or blunt nosed and the shoulder may include therewith either on elongated or stub nosed extension for axially positioning the inner sleeve. The radial profile ($x_7'$) at every point ($ty$) (where $ty$ is numerically equal to the axial distance from the forward point of the mandrel profile to the point from which $x_7'$ is to be determined) along the axial profile length $t_1$ of the mandrel portion of the present invention varies according to the relationship:

$$x_7' = \tfrac{1}{2}\left(x_6^2 - \frac{Q}{\dfrac{Q}{(x_6^2 - x_0^2)} + ty^n R}\right)^{\frac{1}{2}}$$

where $$R = \left(\frac{Q}{(x_6^2 - x_7^2)} - \frac{Q}{(x_6^2 - x_0^2)}\right)\frac{1}{t_1}\,n$$

and where $Q$ is a constant determined by the diametral and length parameters of the bushing insert; where $n$ is a positive integer equal to 1,2,3 . . . n. A constant velocity profile is provided where $n = 1$ and a constant acceleration profile is provided where $n = 2$.

A better understanding of the nature of the present invention as well as the profile relationships is set forth in the following detailed description of a presently preferred embodiment taken in connection with the drawings.

DESCRIPTION OF PRESENTLY PREFERRED EMBODIMENT

Figure 1:
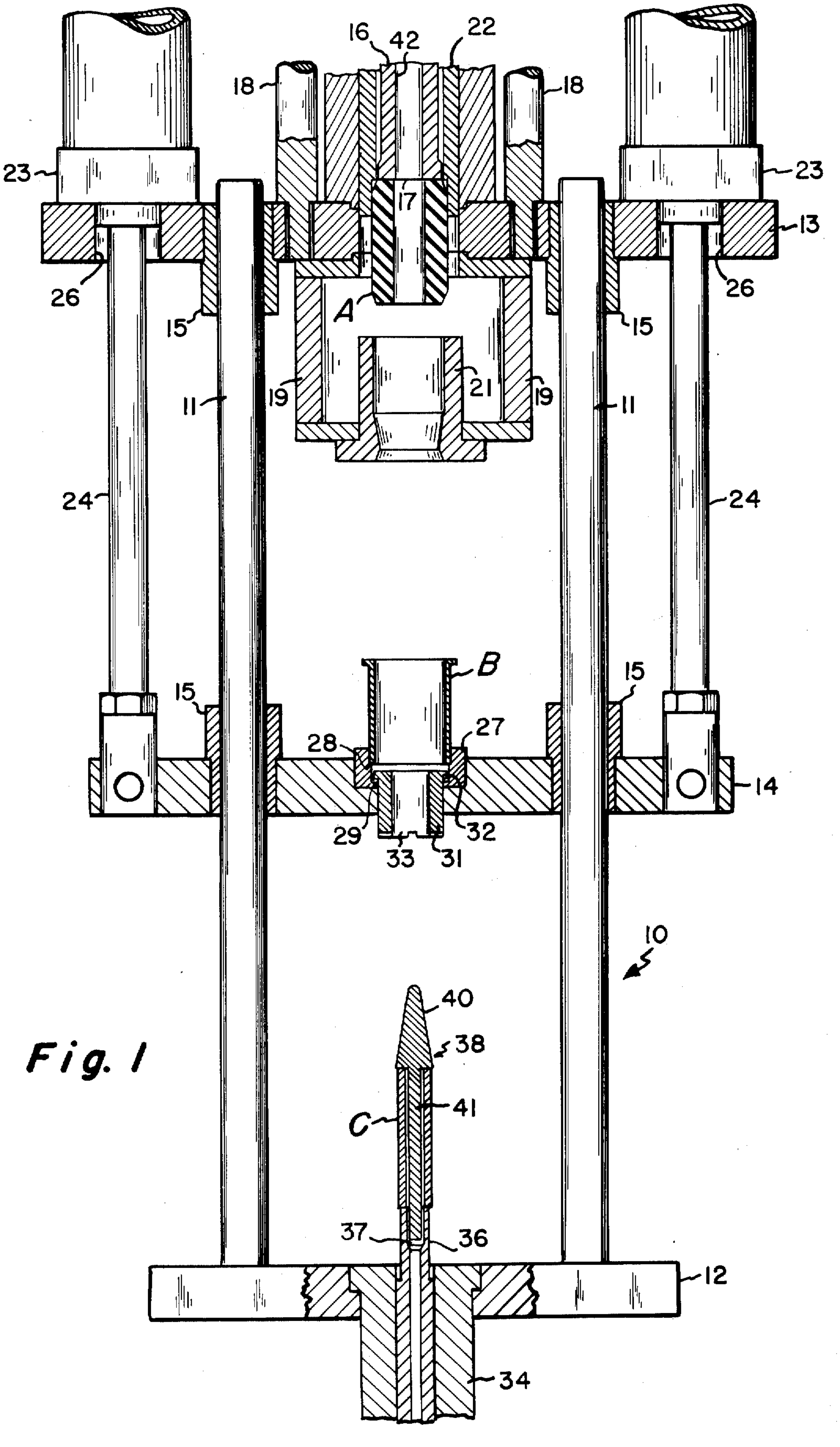
FIG. 1 is an elevation in partial section of the principal components of an apparatus for the assembly of rubber-metal bushings.

For the purposes of understanding the present invention, FIG. 1 represents the principal components in a standard apparatus 10 for assembling rubber-metal type bushings. Apparatus 10 comprises a pair of vertical support guides 11 mounted upon base 12. Slidably mounted upon support guides 11 is an upper cross member 13 and a lower cross member 14. Said members include bearings 15 for slidable engagement with the guides. Upper cross member 13 includes a pneumatic cylindrical plunger 16 having an annular facing surface 17 of a cross section adapted for engagement with elastomeric insert A. Plunger 16 is operably connected to a pneumatic cylinder and power source (not shown).

Upper cross member 13 is connected at its inner extremity to a pair of connecting rods 18 which are themselves connected with pistons (pneumatic or hydraulically actuated), not shown, for moving member 13 along guides 11. Member 13 also includes a depending funnel support member 19 to which is mounted funnel 21 in axial alignment with plunger 16. Spaced between funnel 21 and plunger 16 and in axial alignment therewith is cylindrical insert holder 22. Holder 22 is mounted to upper cross member 13 and is preferably of a diameter substantially equal to the outside diameter of insert A. Located at the outer extremities of member 13 are a pair of pneumatic or hydraulic cylinders 23. Each cylinder is preferably mounted to the top of member 13 and includes a cylinder rod 24 depending therefrom and passing through opening 26 in member 13. The ends of cylinder rods 24 are connected to the outer extremities of lower cross member 14. Cylinder 23 and cylinder rods 24 are adapted to move upper and lower members 13 and 14 relative to each other.

Lower cross member 14 includes an outer sleeve annular nesting member 27 for securely holding the outer sleeve 13 in an axial aligned position to funnel 21, plunger 16, and insert A. Nesting member 27 includes a first inner annular land 28 for preventing axial movement of outer sleeve B. A second inner land 29 is provided for holding a cylindrical insert stop 31. Stop 31 includes a flange 32 for seating engagement with second land 29 and for axially aligning stop 31 within nesting member 27. Cylindrical opening 33 in stop 31 is of a diameter slightly larger than the outer diameter of inner sleeve C. The cross-sectional area of flange 32 and stop 31 is adapted to be of a size sufficient to retain insert A from axial movement during insertion beyond the stop.

Mounted to base 12 is a mandrel adapter holder 34. A mandrel adapter 36 is positioned within holder 34. Both adapter 36 and holder 34 are axially aligned with nesting member 27 and funnel 21. Adapter 36 includes cavity 37 for securely holding and positioning mandrel 38. Mandrel 38 includes an end portion 40 having a diametric relationship to its length in accordance with the present invention and more fully explained hereinafter. For present purposes, the tip of portion 40 is of a diameter equal to, but preferably less than, the diameter of the annular opening through insert A when fully inserted in outer sleeve B. The back or shoulder of portion 40 has a diameter equal to, but preferably larger than, the outside diameter of inner sleeve C. Mandrel 38 includes an elongated cylindrical portion 41 which is adapted to engage within cavity 37. The diameter of cylindrical portion 41 is slightly less than the inside diameter of inner sleeve C.

In operation of apparatus 10, cross members 13 and 14 are initially placed in a fully extended and spaced apart relation to one another. Plunger 16 is fully retracted. An annular elastomeric insert A is positioned in holder 22; outer sleeve B is placed in nesting member 27; and inner sleeve C is placed on portion 41 of mandrel 38 which is then positioned in holder 34. Upper cross member 13 is lowered so that the small face of funnel 21 is abuttingly aligned with peripheral end portion of sleeve B. Plunger 16 is then actuated to abut its surface 17 with the end of insert A and force insert A through the large opening of funnel 21 then through the small opening into sleeve B. Travel of plunger 16 is stopped by appropriate limit switches or the like when insert A contacts stop 31. Thereafter, both upper and lower cross members 13 and 14 are lowered by connecting rods 18 so that mandrel 38 and portion 40, in particular, passes through opening 33 of stop 31, and engagingly passes through and opens the compressed annular opening in insert A. Portion 40 of mandrel exits from insert A into opening 42 of plunger 16. After portion 40 of mandrel 38 has fully exited from insert A, inner sleeve C is properly inserted and aligned within the assembly. Plunger 16 and cross members 13 and 14 are retracted and the assembled bushing is removed.

Figure 2:
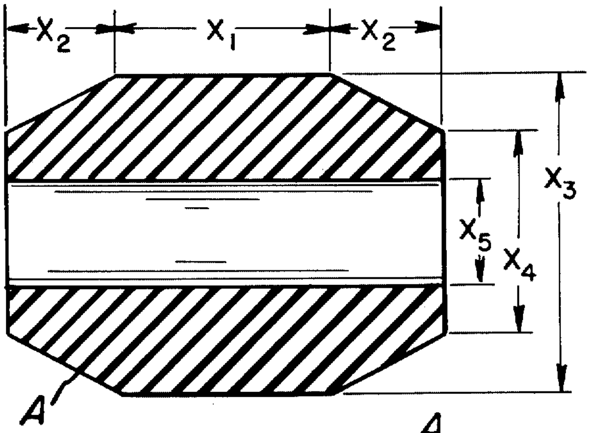
FIG. 2 is a section of the elastomeric insert with various relational parameters.
Figure 3:
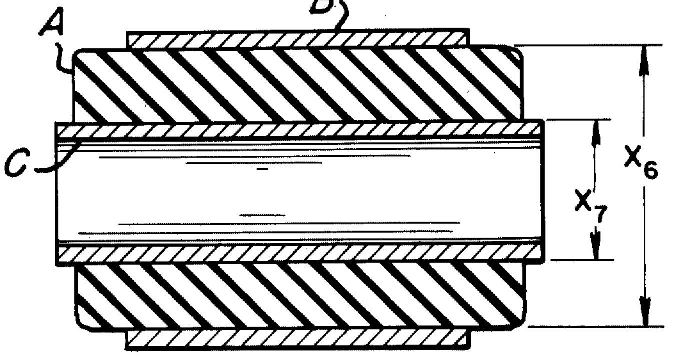
FIG. 3 is a section of the assembled elastomeric insert and sleeves and relational parameters.

Referring to FIGS. 2 and 3, the various relational parameters needed for calculating the radial profile (the radius of the mandrel at every point ($ty$) along the axial profile length $t_1$ of portion 40) of mandrel 38 are disclosed therein and summarized as follows:

$x_0$ = the compressed inner diameter of insert A after insertion into outer sleeve and before insertion into inner sleeve;

$x_1$ = the effective length of insert A;

$x_2$ = the effective length added by the beveled portion of insert A (FIG. 2);

$x_3$ = the outer diameter, uncompressed, of insert A;

$x_4$ = the diameter of the leading edge of insert A; of FIG. 2;

$x_5$ = the uncompressed inner diameter of insert A;

$x_6$ = the inner diameter of outer sleeve B;

$x_7$ = the outer diameter of inner sleeve C.

$ty$ is numerically equal to the axial distance from the forward point of the mandrel profile to the point from which $x_7'$ is to be determined.

$t_1$ is the axial length of the mandrel profile 40.

If the beveled portions of insert A (FIG. 2) are only extensions thereof and do not contribute to the elongation of the insert, then for the purpose of calculating the radial profile of the mandrel $x_2$ and $x_4$ are both deemed to be equal to zero. It should be further noted that it is preferred that for purposes of calculating the maximum radius $x_7'$ of the mandrel, $x_7$ should be taken as slightly larger in value than the actual outer diameter of the inner sleeve (see FIG. 4). For example, $x_7$=0. D. of C + 0.030 inch for a plain end and $x_7$ = O. D. of C + 0.050 inch for a serrated end.

Figure 4:
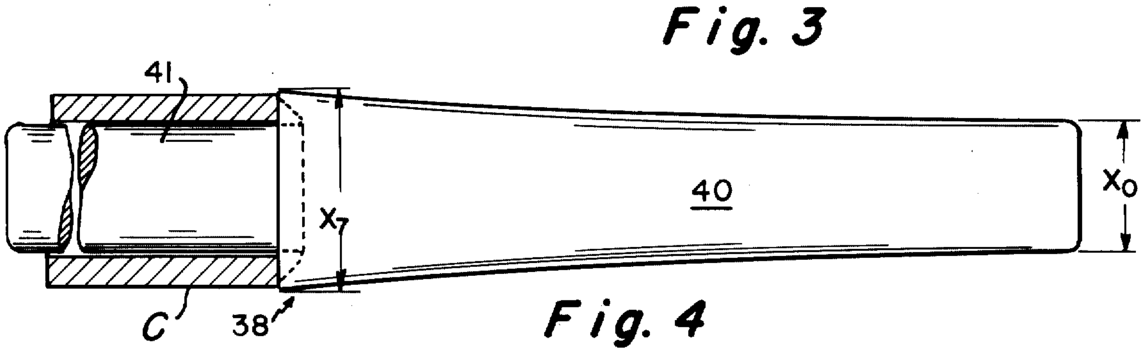
FIG. 4 is a partial section of a mandrel and inner sleeve engaging the shoulder of the mandrel.

Referring to FIG. 4, a constant acceleration profile mandrel is disclosed wherein the value of $x_7$ is increased over the actual outer diameter of sleeve C. $x_7$ in this case, therefore, refers to the preferred diameter at the shoulder of mandrel portion 40. Furthermore, the diameter of the leading edge or tip of mandrel portion 40, $x_0$, should be slightly less than the inner diameter of compressed insert A to facilitate entry therein, for example 0.030 inch.

Figure 5:
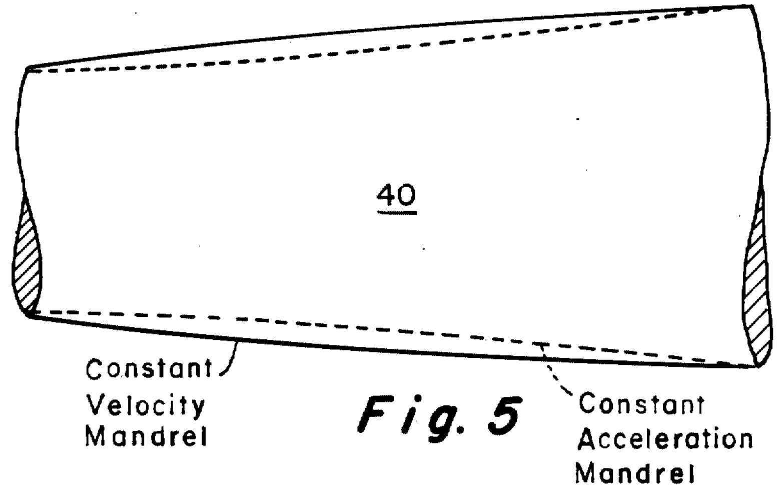
FIG. 5 is an elevated showing the diametric relationship between the constant acceleration and constant velocity mandrels.

FIG. 5 shows the profile relationship between a constant acceleration and constant velocity mandrel. The constant velocity mandrel is shown in solid line and the constant acceleration mandrel in broken line.

The radial profile of the nth time derivative mandrels conform to the present invention wherein the radius ($x_7'$) of the mandrel at every point $t_v$ along its length $t_1$, of 40 is:

$$x_7' = \tfrac{1}{2}\left(x_6^2 - \frac{Q}{\dfrac{Q}{(x_6^2 - x_0^2)} + ty^n R}\right)^{\frac{1}{2}} \text{ where}$$

$$R = \left(\frac{Q}{(x_6^2 - x_7^2)} - \frac{Q}{(x_6^2 - x_0^2)}\right)\frac{1}{t_1} \text{ n,}$$

$$Q = (x_1 + x_2)(x_3^2 - x_5^2) + x_2(x_4^2 - x_5^2), \text{ and}$$

$$n = 1,2,3 \ldots n$$

The profile may vary over its length to include more than one time derivative; for example $n = 1$ for a portion of the length, $n = 2$ for a portion, and the like.

For a constant acceleration mandrel $n = 2$.

For the radial profile, $x_7'$, of a constant velocity mandrel $n = 1$:

$$x_7' = \tfrac{1}{2}\left(x_6^2 - \frac{Q}{\dfrac{Q}{(x_6^2 - x_0^2)} + t_v R}\right)^{\frac{1}{2}} \text{ where}$$

$$R = \left(\frac{Q}{(x_6^2 - x_7^2)} - \frac{Q}{(x_6^2 - x_0^2)}\right)\frac{1}{t_1} \text{ and}$$

$$Q = (x_1 + x_2)(x_3^2 - x_5^2) + x_2(x_4^2 - x_5^2)$$

In Table I a diametrical comparison is provided of the constant acceleration and constant velocity mandrels of FIG. 5. The mandrel length of portion 40, $t$, is equal to 5.625 inches, $x_0$ was 1.88 inches and $x_7$ was 2,836 inches.

TABLE I

| $t_v$ (in inches) | 2 . $x_7'$ = DIAMETER FOR CONSTANT ACCELERATION (in inches) (n = 2) | 2 . $x_7'$ = DIAMETER FOR CONSTANT VELOCITY (in inches) (n = 1) |
|---|---|---|
| 0.5 | 1.8946 | 2.0324 |
| 1.0 | 1.9372 | 2.1614 |
| 1.5 | 2.004 | 2.2728 |
| 2.0 | 2.0892 | 2.3702 |
| 2.5 | 2.1876 | 2.4564 |
| 3.0 | 2.2932 | 2.5334 |
| 3.5 | 2.4020 | 2.6026 |
| 4.0 | 2.5 .04 | 2.6652 |
| 4.5 | 2.6156 | 2.7222 |
| 4.0 | 2.716 | 2.7742 |

Various mandrel lengths having both constant acceleration and constant velocity profiles were compared with conventional tapered mandrels of the prior art. The conventional mandrels used for comparison were a two inch ($t_1$) straight taper (P) and a two inch ($t_1$) straight taper with a blunt nose (B). The mandrel profiles of the present invention used for comparison included:

| MANDREL | $t_1$ | PROFILE |
|---|---|---|
| 2.5 A | 2.5" | Constant Acceleration |
| 2.5 V | 2.5" | Constant Velocity |
| 1.75 A | 1.75" | Constant Acceleration |
| 1.75 V | 1.75" | Constant Velocity |
| 1.00 A | 1.00" | Constant Acceleration |
| 1.00 V | 1.00" | Constant Velocity |

Table II shows the comparative assembly forces required for the insertion of inner sleeve C into the radially compressed insert A, between the conventional mandrels, P and B, and the above profiled mandrels.

TABLE II

| Inner Sleeve Assembly Forces With Various Mandrel Designs | | | | | |
|---|---|---|---|---|---|
| Mandrel Design | Average Inner Metal Force of Three Assemblies per Test (lbs.) | | | | Four Test Average |
| | Test 1 | Test 2 | Test 3 | Test 4 | |
| 2.5 A | 117 | 129 | 100 | 108 | 113.5 |
| 2.5 V | 161 | 107 | 135 | 93 | 124.0 |
| P | 28 | 178 | 233 | 223 | 230.25 |
| B | 187 | 170 | 168 | 143 | 167.0 |
| 1.75 A | 126 | 123 | 121 | 113 | 120.75 |
| 1.75 V | 157 | 106 | 138 | 153 | 138.5 |

TABLE II-continued

| Inner Sleeve Assembly Forces With Various Mandrel Designs | | | | | |
|---|---|---|---|---|---|
| Mandrel Design | Average Inner Metal Force of Three Assemblies per Test (lbs.) | | | | Four Test Average |
| | Test 1 | Test 2 | Test 3 | Test 4 | |
| 1.00 A | 160 | 179 | 158 | 203 | 175.0 |
| 1.00 V | 157 | 139 | 196 | 178 | 167.5 |

Constants:
A. Shooting Machine Settings
1. Main piston - 70 psi
2. Plunger piston - 45 psi
B. Circolite Oil Table III shows comparatively the average force required for insertion of heavily phosphated coated metal inner sleeves between the conventional mandrel and those of the present invention.

TABLE III

| Heavily Phosphate Coated Metals | |
|---|---|
| Mandrel | Average Force (lbs.) |
| 2.5 A | 161 |
| 2.5 V | 190 |
| P | 450 (Heavy Oil Required) |
| B | 425 |
| 1.75 A | 223 |
| 1.75 V | 236 |
| 1.00 A | 391 (Heavy Oil Required) |
| 1.00 V | 302 |

Note: Sun 2150 was the heavy oil used.

As can be seen from Tables II and III, the force required for inserting the inner sleeve within the compressed elastomeric insert is substantially reduced by means of mandrels of the nth time derivative and, in particular, mandrels having either a constant acceleration or constant velocity profile of the present invention. Attendant reduction in noise during assembly is also provided by the mandrels of the present invention.

While it is preferable that the profile conform to the relationships set forth above at every point ty along the length of the mandrel, it is clear that straight line approximations achieve substantially the same results while reducing the costs of machining the mandrel profile.

Further, it is clear that the tip of mandrel portion 40 can be rounded, FIG. 1, or blunted, FIG. 5, or it may be elongated as in FIG. 4. For example, in the case of the mandrel disclosed in FIG. 4, the elongation of the tip is approximately one-half inch. At every point along the tip, the diameter is equal to $x_0$. Elongation of the tip would be required where the mandrel of the present invention is used in apparatus such as that disclosed in U.S. Pat. No. 3,555,655.

While presently preferred embodiments of the invention have been shown and described in particularity, the invention may be otherwise embodied within the scope of the appended claims.

I claim:

1. In a method for assembling a resilient bushing having an outer sleeve, an inner sleeve and an annular elastomeric insert radially compressed between said sleeves comprising:

mounting said insert in compression within said outer sleeve, and, expanding the interior of said insert when mounted within said outer sleeve and mounting said inner sleeve within said insert as expanded to place said insert in radial compression between said sleeves with means including an expanding mandrel preceding said inner sleeve through said insert and expanding the interior of said insert at a predetermined rate of expansion to mount said inner sleeve within said insert when so expanded;

the movement wherein: said expanding mandrel is provided with a radial profile conforming to the relation:

$$X_7' = \frac{1}{2}\left( X_6^2 - \frac{Q}{+t_y^n R + \frac{Q}{(X_6^2 - X_0^2)}} \right)^{1/2} \text{ where}$$

$X_7'$ = the radius of said mandrel at every point $t_y$ extending from the leading end of said mandrel along the entire length $t_1$ thereof; and where $$R = \left( \frac{Q}{(X_6^2 - X_7^2)} - \frac{Q}{X_6^2 - X_0^2} \right) \frac{1}{t_1^n} \text{; and}$$

$$Q = (X_1 + X_2)(X_3^2 - X_5^2) + X_2 (X_4^2 - X_3^2);$$

$X_0$ = inner diameter of said insert when compressed within said outer sleeve;

$X_1$ = effective length of said insert $X_2$ = length of any extension portion to said insert when uncompressed which contributes to its elongation;

$X_2 = 0$ without contribution to elongation;

$X_3$ = outer diameter of said insert when uncompressed;

$X_4$ = leading diameter of $X_2$; $X_4 = 0$ when $X_2 = 0$;

$X_5$ = inner diameter of said insert when uncompressed;

$X_6$ = inner diameter of said outer sleeves and outer diameter of said insert when compressed therein;

$X_7$ = outer diameter of said inner sleeve and inner diameter of said insert when compressed between said sleeves; and $n$ = a positive integer selected from the numbers 1 and 2; whereby the force required for assembling the inner sleeve in the insert is held to a minimum.

2. The method of claim 1 wherein $X_7$ = outer diameter of the inner sleeve plus between about 0.030 and 0.050 inches.

* * * * *